United States Patent [19]
Cook

[11] Patent Number: 6,109,842
[45] Date of Patent: *Aug. 29, 2000

[54] TOOL HOLDER WITH HARMONIC DAMPENING DRIVE MECHANISM

[76] Inventor: Harold D. Cook, 33642 Via Martos, Dana Point, Calif. 92629

[*] Notice: This patent is subject to a terminal disclaimer.

[21] Appl. No.: 09/368,295

[22] Filed: Aug. 3, 1999

[51] Int. Cl.⁷ ...................................................... B23C 9/00

[52] U.S. Cl. ........................... 409/131; 29/447; 279/103; 279/158; 408/143; 409/141; 409/234

[58] Field of Search .................................... 279/103, 158; 408/143; 409/141, 131, 232–234; 29/447

[56] References Cited

U.S. PATENT DOCUMENTS

| | | | |
|---|---|---|---|
| 845,717 | 2/1907 | Miller | 403/370 |
| 1,285,589 | 11/1918 | Barnes . | |
| 1,404,016 | 1/1922 | Engelbrekt . | |
| 1,409,753 | 3/1922 | Moore . | |
| 1,539,413 | 5/1925 | Fish . | |
| 1,658,504 | 2/1928 | Weiss . | |
| 1,936,498 | 11/1933 | Corbett | 76/108 |
| 1,994,792 | 3/1935 | Sanderson | 255/63 |
| 2,058,618 | 10/1936 | Patzig | 403/273 |
| 2,125,005 | 7/1938 | Jearum | 29/96 |
| 2,161,062 | 6/1939 | Killgore | 262/33 |
| 2,374,919 | 5/1945 | Bruseth | 90/11 |
| 2,729,458 | 1/1956 | Sacrey | 279/41 |
| 2,860,547 | 11/1958 | Sephan | 90/11 |
| 2,893,291 | 7/1959 | Hollis | 90/11 |
| 2,913,935 | 11/1959 | Flannerty et al. | 77/58 |

(List continued on next page.)

FOREIGN PATENT DOCUMENTS

| | | | |
|---|---|---|---|
| 0026751 | 11/1981 | European Pat. Off. | 279/11 S |
| 382079B1 | 8/1993 | European Pat. Off. . | |
| 575009 | 4/1933 | Germany . | |
| 662704 | 6/1938 | Germany . | |
| 1008546 | 5/1957 | Germany . | |
| 1008085 | 10/1957 | Germany . | |
| 1238311 | 4/1967 | Germany . | |
| 2229374 | 1/1974 | Germany | 279/1 A |
| 2759007 | 8/1978 | Germany | 408/239 A |
| 2811977 | 9/1979 | Germany . | |
| 3701602 | 8/1988 | Germany . | |
| 3925641C2 | 9/1992 | Germany . | |
| 53-16976 | 2/1978 | Japan | 279/1 A |
| 57107710 | 5/1982 | Japan | 279/9.1 |
| 376182 | 5/1979 | U.S.S.R. . | |
| 1493389 | 7/1989 | U.S.S.R. . | |
| 425539 | 4/1935 | United Kingdom . | |
| 551065 | 2/1942 | United Kingdom . | |
| 729295 | 5/1955 | United Kingdom | 279/8 |
| 921522 | 3/1963 | United Kingdom | 340/279 |
| 1319200 | 6/1973 | United Kingdom . | |
| 2137124A | 10/1984 | United Kingdom | 279/7 |

OTHER PUBLICATIONS

Coolant Adapters (Flush Cut) by X–L Tool company; 1 page.

Mi–Tech Metals, Inc., "High Density Tungsten Based Metals" 4 pages.

*Primary Examiner*—Steven C. Bishop
*Attorney, Agent, or Firm*—Stetina Brunda Garred & Brucker

[57] ABSTRACT

A tool holder that uses a dampening drive member to reduce slippage between the tool holder and the spindle and while further eliminating harmonic resonance. The tool holder is used in a rotating spindle that has at least one cam recess formed on a lower face thereof. The tool holder includes a conically tapered shank portion which is insertable into the spindle. Disposed adjacent to the shank portion is a flange portion. Extending about the flange portion is a compressible dampening drive member that has at least one cam portion sized and configured to engage a respective one of the cam recesses of the spindle. When the tool holder is secured to the spindle, the dampening drive member is compressed therebetween. The dampening drive member is adapted to eliminate harmonic resonance attributable to the use of the tool holder and prevent slippage between the tool holder and the spindle.

22 Claims, 2 Drawing Sheets

U.S. PATENT DOCUMENTS

| | | | |
|---|---|---|---|
| 2,918,290 | 12/1959 | Werstein | 279/19 |
| 2,920,913 | 1/1960 | Antila | 287/119 |
| 2,942,891 | 6/1960 | Zale | 279/1 |
| 3,053,118 | 9/1962 | Lavallee . | |
| 3,221,404 | 12/1965 | Averill et al. | 29/568 |
| 3,307,243 | 3/1967 | Andreasson | 29/106 |
| 3,372,951 | 3/1968 | McCash | 287/91 |
| 3,397,615 | 8/1968 | Meinke | 90/11 |
| 3,424,055 | 1/1969 | Pollat | 90/11 |
| 3,463,048 | 8/1969 | Owsen | 90/11 |
| 3,557,419 | 1/1971 | Flannery | 29/105 |
| 3,643,546 | 2/1972 | Richter et al. | 90/11 A |
| 3,678,632 | 7/1972 | Eversole et al. | 408/144 |
| 3,725,994 | 4/1973 | Wechsler | 29/447 |
| 3,734,515 | 5/1973 | Dudek | 279/1 A |
| 3,807,804 | 4/1974 | Kniff | 299/91 |
| 3,876,320 | 4/1975 | Phillipson | 403/370 |
| 3,937,587 | 2/1976 | Lindem et al. | 408/181 |
| 3,945,752 | 3/1976 | Bennett | 408/146 |
| 3,989,260 | 11/1976 | Zonkov et al. | 279/4 |
| 3,994,615 | 11/1976 | Narang | 408/226 |
| 4,021,051 | 5/1977 | Toyomoto et al. | 279/1 N |
| 4,099,889 | 7/1978 | Vig | 408/239 R |
| 4,133,545 | 1/1979 | Komori | 279/83 |
| 4,226,562 | 10/1980 | Schmid et al. | 409/233 |
| 4,251,113 | 2/1981 | Mitin et al. | 299/69 |
| 4,274,774 | 6/1981 | Haga et al. | 409/232 |
| 4,298,208 | 11/1981 | Benjamin et al. | 279/91 |
| 4,305,203 | 12/1981 | Bock et al. | 29/800 |
| 4,377,292 | 3/1983 | Staron | 279/46 R |
| 4,436,463 | 3/1984 | Rea | 409/232 |
| 4,453,775 | 6/1984 | Clemmow | 299/81 |
| 4,483,108 | 11/1984 | Howard | 408/144 |
| 4,560,289 | 12/1985 | Wood, III | 384/99 |
| 4,619,564 | 10/1986 | Jacobson | 408/146 |
| 4,619,566 | 10/1986 | Botimer | 409/232 |
| 4,642,005 | 2/1987 | Kondo et al. | 409/232 |
| 4,655,655 | 4/1987 | Schurfeld | 409/232 |
| 4,668,138 | 5/1987 | Carter | 409/234 |
| 4,795,292 | 1/1989 | Dye | 409/136 |
| 4,808,049 | 2/1989 | Cook | 409/234 |
| 4,811,632 | 3/1989 | Salyer | 76/24 R |
| 4,818,161 | 4/1989 | Cook | 409/233 |
| 4,934,743 | 6/1990 | Kapgan et al. | 285/23 |
| 4,971,491 | 11/1990 | Cook | 409/131 |
| 4,991,991 | 2/1991 | Ito et al. | 403/30 |
| 4,993,894 | 2/1991 | Fischer et al. | 408/14 |
| 5,024,563 | 6/1991 | Randall | 408/144 |
| 5,048,375 | 9/1991 | Koyabyashi | 76/108 |
| 5,052,610 | 10/1991 | Guerra et al. | 403/273 |
| 5,098,234 | 3/1992 | Judkins et al. | 408/204 |
| 5,150,636 | 9/1992 | Hill | 76/108.2 |
| 5,277,435 | 1/1994 | Kramer et al. | 29/9.1 |
| 5,278,354 | 1/1994 | Lhomme | 174/84 R |
| 5,280,671 | 1/1994 | Marquart . | |
| 5,311,654 | 5/1994 | Cook . | |
| 5,352,074 | 10/1994 | Ishikawa | 409/232 |
| 5,582,494 | 12/1996 | Cook | 409/234 |
| 5,593,258 | 1/1997 | Matsumoto et al. | 409/234 |
| 5,775,857 | 7/1998 | Johne | 409/234 |
| 5,797,605 | 8/1998 | Gross et al. | 279/405 |
| 5,975,816 | 11/1999 | Cook | 408/143 |

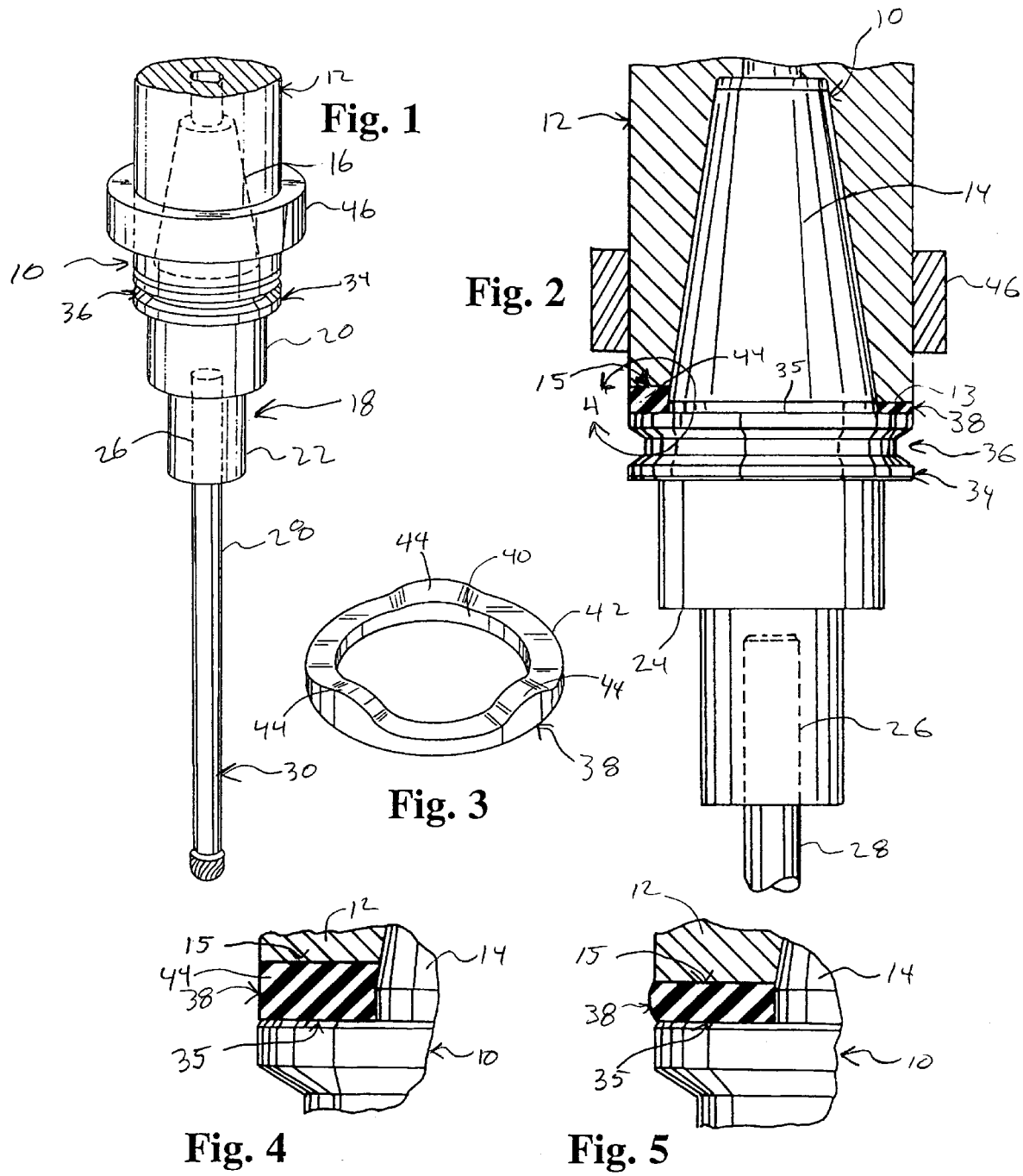

TOOL HOLDER WITH HARMONIC DAMPENING DRIVE MECHANISM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to machine tools, and more particularly to a tool holder including an elastomeric drive dampener for eliminating harmonic resonance and preventing slippage between the tool holder and machine tool spindle.

As is well known, various tool holders have been utilized in the prior art which interface with a rotating spindle of a machine such as a milling or boring machine. These tool holders securely hold a cutting tool upon the machine during the cutting of a work piece. In most prior art tool holders, a central aperture is formed therein for receiving the shank portion of the cutting tool which is to be interfaced to the milling or other machine. Subsequent to the insertion of the shank portion of the cutting tool into the central aperture, the tool holder is drawn or pulled tightly into the spindle so as to rigidly maintain the cutting tool within the tool holder. Typically, the spindle of the machine tool includes a series of drive lugs disposed circumferentially about the spindle. The drive lugs mate with a series of lug recesses formed within the tool holder when the tool holder is drawn into the spindle. The drive lugs prevent slippage between the tool holder and the spindle during rotation of the machine tool.

Though interfacing the cutting tool to the machine, the prior art tool holders possess certain deficiencies which detract from their overall utility. In particular, when the elongate, extended shank of a long reach cutting tool is inserted into and secured within the central aperture of the tool holder, there is a tendency for a harmonic resonance to be generated through the cutting tool and into the tool holder, particularly when the cutting tool is used in a high speed milling application. Additionally, the drive lugs formed on the spindle and the lug recesses formed on the tool holder may not be perfectly positioned and balanced, thereby additionally giving rise to a harmonic resonance. Transfer of the harmonic resonance into the tool holder gives rise to slight movements thereof relative to the spindle, and in extreme cases results in the tool holder loosening within the spindle. As will be recognized, the resonance of the tool holder relative to the spindle results in the cut in the work piece being substantially out of tolerance.

A further deficiency with the prior art tool holders is that the manner in which the shank portion of the cutting tool is secured within the central aperture of the tool holder often results in the non-concentric mounting of the cutting tool within the tool holder. Such non-concentric mounting is unacceptable in modern, high tolerance machining applications such as those performed on a vertical milling machine. The minor variations in concentricity can further lead to imbalance of the tool holder and cutting tool thereby frequently leading to catastrophic failure in the cutting operation.

The present invention addresses the deficiencies of prior art tool holders by providing a tool holder which includes a dampening drive member for eliminating the harmonic resonance which typically occurs when long reach, extended shank cutting tools are used in high speed milling applications. Additionally, the present invention provides a tool holder that eliminates the use of locking lugs and recesses on the spindle and tool holder thereby reducing harmonic resonance occurring from such. In the tool holder constructed in accordance with the present invention, the non-concentric mounting of the shank portion of the cutting tool within the tool holder is also substantially eliminated by heat shrinking the shank portion of the cutting tool within the tool holder.

BRIEF SUMMARY OF THE INVENTION

In accordance with the preferred embodiment of the present invention, there is provided a tool holder used to secure a machine tool to a rotating spindle of a milling or grinding machine. The spindle defines a bottom face that has at least on cam recess formed thereon. The tool holder comprises a conically tapered shank portion for insertion into the spindle, and a cutting tool mounting portion for securement of the cutting tool. Disposed between the cutting tool mounting portion and the shank portion is a flange portion. Extending about the shank portion on an upper face of the flange portion is a dampening drive member. The dampening drive member is formed with at least one cam portion sized and configured to be receivable into the cam recess when the tool holder is inserted into the spindle. Additionally, the dampening drive member is compressible between the flange portion and the spindle when the tool holder is inserted into the spindle to thereby eliminate harmonic resonance attributable to the use of the tool holder. Furthermore, the dampening drive member prevents slippage between the tool holder and the spindle by frictionally engaging the spindle with the cam portion.

In the preferred embodiment of the present invention, the dampening drive member is fabricated from an elastomeric material. The dampening drive member defines an upper and lower surface, and the cam portion protrudes from the upper surface thereof. Typically, the cam portion has an arcuately contoured configuration wherein the cam portion is formed as a protuberance on the dampening drive member. In the preferred embodiment of the present invention, three cam portions can be formed equidistantly spaced around the circumference of the dampening drive member. The cam portions are receivable into complementary cam recesses formed on the spindle.

The tool holder constructed in accordance with the preferred embodiment of the present invention can further include a compression ring to ensure engagement of the tool holder with the spindle. The compression ring is extensible about an exterior surface of the spindle and assists in maintaining the shank portion of the tool holder therewithin. The compression ring is sized and configured to be secured to the spindle via heat shrink process.

The tool holder constructed in accordance with the present invention is used by inserting the shank portion of the tool holder within the spindle such that the cam portion of the dampening drive member is receivable into a respective cam recess of the spindle. Next, the tool holder is secured within the spindle by drawing the tool holder thereinto. The dampening drive member is therefore compressed between the flange portion and the spindle in order to reduce slippage and harmonic resonance therebetween. The compression ring may be secured about the spindle via a heat shrink process. Additionally, prior to inserting the tool holder within the spindle, a cutting tool may be inserted within the tool holder via a heat shrink process.

BRIEF DESCRIPTION OF THE DRAWINGS

These as well as other features of the present invention, will become more apparent upon reference to the drawings wherein:

FIG. 1 is a perspective view of the tool holder of the present invention as inserted into the rotating spindle of a milling machine;

FIG. 2 is a partial cross-sectional view of the tool holder as inserted into the rotating spindle of the milling machine, and illustrating a dampening drive member of the tool holder;

FIG. 3 is a perspective view of the dampening drive member of the tool holder of the present invention;

FIG. 4 is an enlarged view of the encircled region 4 in FIG. 2 illustrating the dampening drive member in an uncompressed state;

FIG. 5 is an enlarged view similar to FIG. 4 illustrating the dampening drive member of the tool holder in a compressed state.

DETAILED DESCRIPTION OF THE INVENTION

Figure 6:
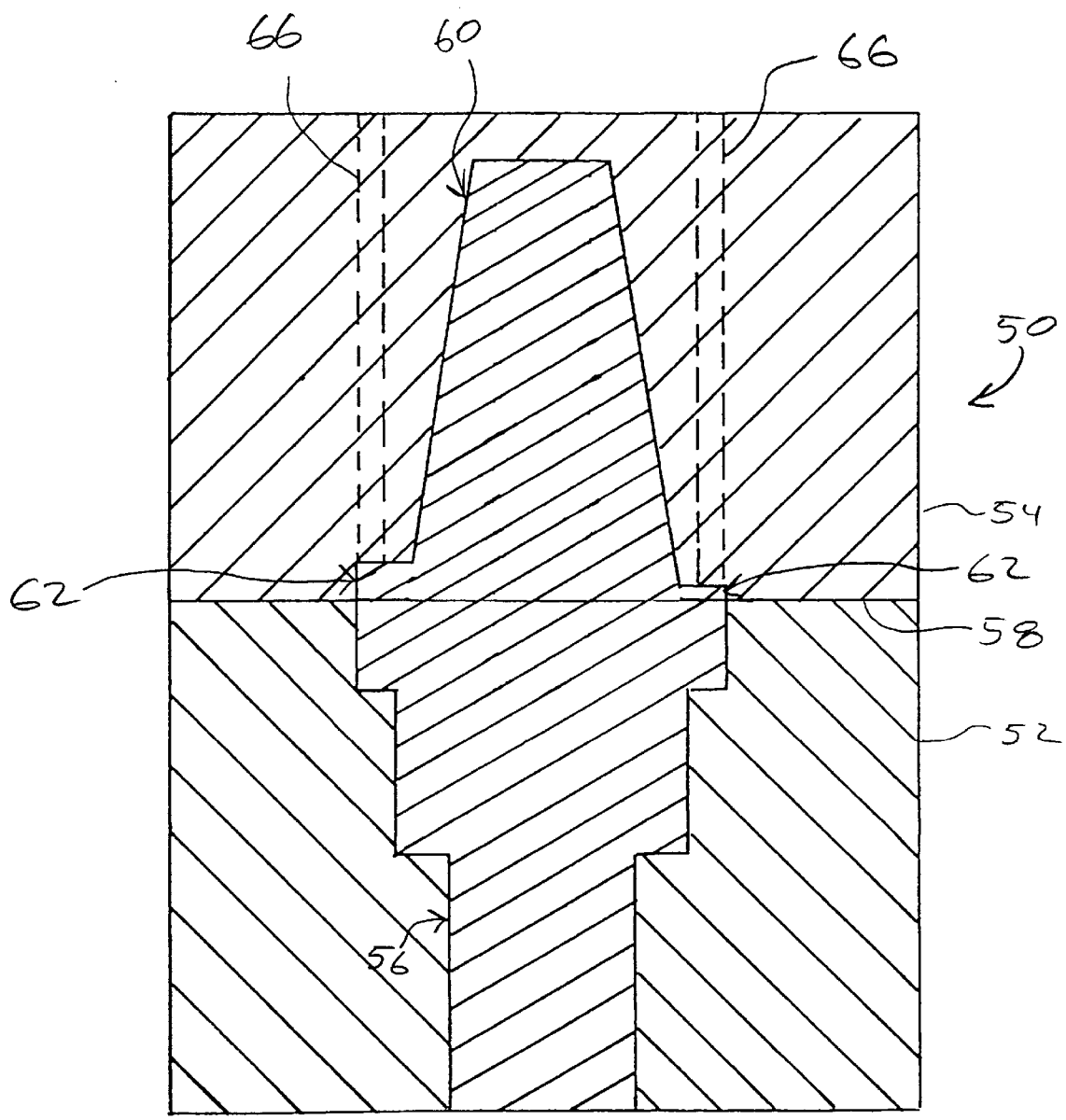
FIG. 6 is a cross-sectional view of a mold used to form the dampening drive member upon the tool holder.

Referring now to the drawings wherein the showings are for purposes of illustrating s preferred embodiment of the present invention only, and not for purposes of limiting the same, FIG. 1 perspectively illustrates a tool holder 10 which is adapted for use in a rotating spindle 12 of a boring or milling machine. The tool holder 10 is fabricated from a tool steel such as H13 or A2 tool steel, or an alloy steel such as 4340 alloy steel. In the preferred embodiment of the present invention, the tool holder 10 comprises a conically tapered shank portion 14 which is adapted to be inserted into a complementary recess 16 formed within the spindle 12. In this respect, the slope of the inner surface of the recess 16 corresponds to the slope of the outer surface of the shank portion 14. Therefore, the shank portion 14 may be firmly seated within the recess 16 when the tool holder 10 is properly secured to the spindle 12. Typically, the tool holder 10 is secured to the spindle 12 by drawing the shank portion 14 upwardly into the recess 16. In the preferred embodiment of the present invention, the spindle 12 has a bottom face 13 circumferentially surrounding the lower end of the recess 16. Disposed upon the bottom face 13 of the spindle 12 is at least one cam recess 15. The cam recess 15 is a slight hollow formed in the bottom face 13 of spindle 12. In the preferred embodiment of the present invention, the bottom face 13 of the spindle 12 comprises three cam recesses 15 disposed equidistantly about the circumference of the spindle 12, as will be further explained below.

In addition to the shank portion 14, the tool holder 10 of the present invention comprises a cutting tool mounting portion 18 which includes a cylindrically configured upper section 20 and a cylindrically configured lower section 22. The lower section 22 extends axially from the upper section 20 and has an outer diameter which is less than the outer diameter of the upper section 20 thereby defining an annular shoulder 24 between the upper and lower sections 20, 22. Extending axially within the lower section 22 of the mounting portion 18 is a central aperture 26 which is adapted to receive the shank 28 of a cutting tool 30. As will be discussed in more detail below, the tool holder 10 of the present invention is particularly suited for use with a "long reach" cutting tool having an elongate, extended shank. However, those of ordinary skill in the art will recognize that the tool holder 10 of the present invention may also be used in conjunction with cutting tools having shanks of substantially lesser length. Though not shown, it will be recognized that the mounting portion 18 of the tool holder 10 may be of uniform diameter rather than including the differently sized upper and lower sections 20, 22.

In addition to the shank and mounting portions 14, 18, the tool holder 10 comprises a circularly configured flange portion 34 which is formed between the shank portion 14 and the mounting portion 18. The flange portion 34 extends radially outward relative to the shank portion 14 and upper section 20. The upper surface of the flange portion 34 extends radially outward from the shank portion 14 such that an upper face 35 is defined thereby. The flange portion 34 additionally includes a generally V-shaped slot 36 disposed within the peripheral edge thereof and extending circumferentially thereabout. The slot 36 is adapted to accommodate a tool holder changer (not shown) that contacts and carries the tool holder 10 for automatic removal and insertion of the tool holder 10 from and into the spindle 12. Those skilled in the art will recognize that the tool holder 10 of the present invention is similar to standard tool holder dimensional configurations such as the American Standard, Japanese B. T., European B. N., and Caterpillar V-Flange Standard.

Referring now to FIGS. 2–5, the tool holder 10 of the present invention further comprises an annular, ringlike dampening drive member 38. The dampening drive member 38 is disposed on upper face 35 of flange portion 34 and extends about (i.e., circumvents) the base of the shank portion 14. In this respect, the dampening drive member 38 has a generally annular configuration. As best seen in FIGS. 2 and 4, the dampening drive member 38 is sized such that when positioned in the aforementioned manner, an inner edge 40 thereof either contacts or is disposed in extremely close proximity to the base of the shank portion 14. Additionally, the dampening drive member 38 is placed such that an outer edge 42 thereof is substantially flush with the peripheral edge of the flange portion 34.

The dampening drive member 38 further comprises three integral drive cam portions 44 protruding upwardly therefrom. As best seen in FIG. 3, each of the drive cam portions 44 is a bump or protuberance that is formed on the upper surface of the dampening drive member 38. Each of the drive cam portions 44 has an arcuately contoured configuration whereby the top of each drive cam portion 44 is rounded. The drive cam portions 44 are equidistantly spaced around the circumference of the dampening drive member 38 (i.e., in intervals of approximately 120 degrees). The drive cam portions 44 are disposed on a side of the dampening drive member 38 that will contact the bottom face 13 of spindle 12 when the tool holder 10 is drawn therein. The slope of the drive cam portions 44 is complementary to that of the cam recesses 15 such that each of the drive cam portions 44 is receivable into a respective one of the cam recesses 15 formed on the bottom face 13 of spindle 12. The dampening drive member 38 may be fabricated from a compressible, shim-like material such as a soft fabric insert. In the preferred embodiment of the present invention, the dampening drive member 38 is an elastomeric material such as rubber. As will be recognized by those of ordinary skill in the art, the hardness of the dampening drive member 38 may be adjusted according to the amount of dampening necessary.

As best seen in FIGS. 2, 4, and 5, with the dampening drive member 38 operatively positioned upon upper face 35 of the flange portion 34, the shank portion 14 of the tool holder 10 is inserted into the recess 16 of the spindle 12 such that the dampening drive member 38 contacts both the flange portion 34 and the spindle 12 (FIG. 4). The tool holder 10 is inserted into the spindle 12 such that each of the drive cam portions 44 of dampening drive member 38 are aligned with a respective cam recess 15 of spindle 12. When the shank portion 14 is drawn or pulled into the recess 16 for purposes of rigidly securing the tool holder 10 to the spindle 12, the dampening drive member 38, due to its fabrication from an elastomeric material, is compressed between the upper face of flange portion 34 and bottom face 13 of spindle 12. Therefore, the outer edge 42 of dampening drive member 38 bulges outward relative to the peripheral edge of the flange portion 34 and the outer surface of the spindle 12 (FIG. 5). Furthermore, each of the drive cam portions 44 is compressed within a respective cam recess 15 thereby engaging the dampening drive member 38 to the spindle 12.

As previously indicated, the tool holder 10 of the present invention is particularly suited for use in conjunction with a long reach cutting tool, such as the cutting tool 30 shown in FIG. 1. When the long reach cutting tool 30 is used in a high speed milling application, there is a tendency for a harmonic resonance to be generated by the shank 28 and transferred into the tool holder 10. Advantageously, the dampening drive member 38, when compressed in the manner shown in FIG. 5, dampens and eliminates the harmonic resonance transferred into the tool holder 10 by the cutting tool 30. The dampening of such harmonic resonance prevents slight movements of the cutting tool 30 relative to the tool holder 10 which could cause cuts made by the cutting head of the cutting tool 30 to be substantially out of tolerance, or in extreme cases, could result in the loosening of the tool holder 10 within the spindle 12.

Additionally, the dampening drive member 38 prevents slippage between the spindle 12 and the tool holder 10 without causing harmonic resonance. As previously stated, each of the drive cam portions 44 engages a corresponding cam recess 15 of spindle 12. The drive cam portions 44 prevent rotational slippage between the spindle 12 and tool holder 10 when the dampening drive member 38 is compressed therebetween. Specifically, the dampening drive member 38 locks the spindle 12 to the tool holder 10. In this respect, the upper face 35 of flange portion 34 may be ground rough to provide added frictional engagement between the dampening drive member 38 and the tool holder 10. Alternatively, in the preferred embodiment of the present invention, the dampening drive member 38 is formed upon the tool holder 10 such that the dampening drive member 38 frictionally engages the upper face 35 of flange portion 34, as will be further explained below.

In addition to dampening harmonic resonance in the aforementioned manner, the dampening drive member 38 creates a seal between the tool holder 10 and the spindle 12 when compressed in the aforementioned manner. In prior art tool holders, a gap is typically defined between the upper surface of the flange portion and the lower surface of the spindle. However, the dampening drive member 38 of the present invention effectively eliminates such gap by filling the same. The dampening drive member 38 prevents debris, cutting oil, or other contaminants from entering the space formed between the outer surface of the shank portion 14 and the inner surface of the recess 16, thus maintaining the cleanliness of the combined tool holder 10 and spindle 12.

As previously mentioned, the dampening drive member 38 may be integrally formed onto the tool holder 10 through the use of a conventional molding process. As seen in FIG. 6, a mold 50 having a mold cavity 52 and a mold core 54 is used to form the dampening drive member 38 upon the tool holder 10. Specifically, the mold cavity 52 has a tool holder recess 56 formed therein. The tool holder recess 56 is formed complementary to the upper and lower sections 20, 22 of mounting portion 18 such that the tool holder 10 is insertable therein. The tool holder 10 is positioned within the tool holder recess 56 such that the upper face 35 of the flange portion 34 is flush with the upper surface 58 of the mold cavity 52. Alternatively, the tool holder recess 56 may be formed in a manner wherein the tool holder 10 is inserted into the recess 56 such that the flange portion 34 is supported by the top surface 58 of the mold cavity 52 and the core 54 surrounds the flange portion 34.

The core 54 is adapted to mate with the top surface 58 of the mold cavity 52. Formed within the interior of the core 54 is a shank portion recess 60 and a drive member recess 62. As seen in FIG. 6, the shank portion recess 60 is sized to receive the shank portion 14 of the tool holder 10 when the core 54 is placed over the tool holder 10 and mated to the mold cavity 52. The drive member recess 62 is formed adjacent to the shank portion recess 60 on the core 54. The drive member recess 62 is formed such that a void is created between the core 54 and the tool holder 10 when inserted into the mold 50. The drive member recess 62 is sized and configured such that the void is the desired shape of the dampening drive member 38.

The dampening drive member 38 is formed on the tool holder 10 by first rough grinding the upper face 35 of flange portion 34. Next, the tool holder 10 is placed within the mold 50 by placing mounting portion 18 of tool holder 10 within the tool holder recess 56. Next, a prescribed quantity of raw rubber, which will become the dampening drive member 38, is placed on the upper face 35 of flange portion 34. The core 54 is placed over the tool holder 10 such that the raw rubber is pressed between the tool holder 10 and the core 54. As will be recognized to those of ordinary skill in the art, the mold 50 is then heated to vulcanize the rubber and form the dampening drive member 38. Once the rubber has cured to form the dampening drive member 38, the core 54 is removed and the tool holder 10 is removed from the mold cavity 52. Therefore, the dampening drive member 38 is integrally molded onto the flange portion 34 of the tool holder 10 in order to prevent slippage therebetween.

Alternatively, the dampening drive member 38 can be formed by injecting raw rubber into the void 64 when the tool holder 10 is inserted into the mold cavity 52 and the core 54 is mated therewith. Specifically, the core 54 will contain conduits 66 in fluid communication with the drive member recess 62. The raw rubber is injected through the conduits 60 into the void 64 to form the dampening drive member 38. Once, the raw rubber has been injected, the mold 50 is heated to vulcanize the rubber and form the dampening drive member 38.

Referring now to FIGS. 1 and 2, the tool holder 10 of the present invention is preferably used in combination with an annular compression ring 46 which is extensible about the outer surface of the spindle 12. When secured to (i.e., compressed about) the spindle 12, the compression ring 46 assists in maintaining the shank portion 14 of the tool holder 10 firmly seated within the recess 16 of the spindle 12 by ensuring a proper fit between the complementary tapers of the outer surface of the shank portion 14 and the inner surface of the recess 16. In this respect, the compression ring 46 prevents these corresponding tapered surfaces from opening up and loosening the tool holder 10 within the spindle 12. The compression ring 46 is preferably fabricated from a composite material. Additionally, in the preferred embodiment, the compression ring 46 is secured to the spindle 12 via a shrink fitting process. In this respect, the inner diameter of the compression ring 46 is normally sized to be slightly smaller than the outer diameter of the spindle 12. Therefore, in order to slide the compression ring 46 onto the spindle 12, the spindle 12 is cooled to facilitate the thermal contraction thereof from a first outer diameter to a reduced second outer diameter. The compression ring 46 is then advanced over the reduced second outer diameter of the spindle 12. As the spindle 12 returns to ambient temperature, the thermal expansion of spindle 12 results in the compression of the compression ring 46 about the outer surface thereof.

In addition to the compression ring 46 preferably being secured to the spindle 12 via a shrink fitting process, the shank 28 of the cutting tool 30 is preferably secured within the central aperture 26 of the lower section 22 of the mounting portion 18 via a heat shrink process. In this respect, the central aperture 26 has a diameter which is slightly less than the diameter of the shank 28. The application of heat to the lower section 22 via a heat source such as an induction heater effectively increases the diameter of the central aperture 26, thus allowing the shank 28 to be slidably inserted therein. When the external application of heat via the induction heater is discontinued and the lower section 22 of the mounting portion 18 is allowed to cool to ambient temperature, thermal contraction causes the central aperture 26 to form a rigid interface, i.e., a metal-to-metal press fit, between the lower section 22 of the mounting portion 18 and the shank 28 of the cutting tool 30. As such, the heat shrink process rigidly maintains the cutting tool 30 within the tool holder 10 in a concentric fashion for high tolerance machining applications. In this respect, the use of the heat shrinking process prevents the non-concentric mounting of the cutting tool 30 within the tool holder 10.

Additional modifications and improvements of the present invention may also be apparent to those of ordinary skill in the art such as varying the size, shape and number of drive cam portions 44 on the dampening drive member 38. Thus, the particular combination of parts described and illustrated herein is intended to represent only a certain embodiment of the present invention, and is not intended to serve as limitations of alternative devices within the spirit and scope of the invention.

What is claimed is:

1. A tool holder for use in a rotating spindle which defines a bottom face having at least one cam recess thereon, the tool holder comprising:

a conically tapered shank portion for insertion into the spindle;

a cutting tool mounting portion;

a flange portion disposed between the shank and mounting portions; and a dampening drive member extending about the shank portion, the dampening drive member having at least one cam portion sized and configured to be receivable into the cam recess when the tool holder is inserted into the spindle;

the dampening drive member being compressible between the flange portion and the bottom face of the spindle when the tool holder is inserted into the spindle and adapted to thereby eliminate harmonic resonance attributable to the use of the tool holder and prevent slippage between the tool holder and the spindle.

2. The tool holder of claim 1 wherein the cam portion is formed as a protuberance on the dampening drive member.

3. The tool holder of claim 2 wherein the dampening drive member has an annular configuration defining upper and lower surfaces, the cam portion protruding upwardly from the upper surface of the dampening drive member.

4. The tool holder of claim 3 wherein the cam portion has an arcuately contoured configuration.

5. The tool holder of claim 4 wherein the at least one cam portion is three cam portions formed in equidistantly spaced relation on the dampening drive member.

6. The tool holder of claim 1 wherein the dampening drive member is fabricated from an elastomeric material.

7. The tool holder of claim 1 further in combination with a compression ring extensible about the spindle for assisting in maintaining the shank portion of the tool holder firmly seated therewithin.

8. The tool holder of claim 7 wherein the compression ring is sized and configured to be secured to the spindle via a shrink fitting process.

9. The tool holder of claim 7 wherein the compression ring is fabricated from a composite material.

10. In a tool holder having a conically tapered shank portion for insertion into a rotating spindle of a milling machine, a cutting tool mounting portion, and a flange portion disposed between the shank and mounting portions, the improvement comprising a dampening drive member having at least one cam portion which is receivable into a corresponding recess of the spindle and is compressible between the flange portion and the spindle when the tool holder is inserted thereinto, the dampening drive member being adapted to eliminate harmonic resonance attributable to the use of the tool holder with an extended shank cutting tool and slippage between the tool holder and the spindle.

11. The tool holder of claim 10 wherein the cam portion is formed as a protuberance on the dampening drive member.

12. The tool holder of claim 11 wherein the dampening drive member has an annular configuration defining upper and lower surfaces, the cam portion protruding upwardly from the upper surface of the dampening drive member.

13. The tool holder of claim 12 wherein the cam portion has an arcuately contoured configuration.

14. The tool holder of claim 13 wherein the at least one cam portion is three cam portions formed in equidistantly spaced relation on the dampening drive member.

15. The tool holder of claim 10 wherein the dampening drive member is fabricated from an elastomeric material.

16. The tool holder of claim 10 further in combination with a compression ring extensible about the spindle for assisting in maintaining the shank portion of the tool holder firmly seated therewithin.

17. The tool holder of claim 16 wherein the compression ring is sized and configured to be secured to the spindle via a shrink fitting process.

18. The tool holder of claim 16 wherein the compression ring is fabricated from a composite material.

19. A method of mounting a tool holder having a conically tapered shank portion, a cutting tool mounting portion, and a flange portion disposed between the shank and mounting portions into a rotating spindle of a milling machine having at least one cam recess formed on a bottom face thereof, comprising the steps of:

(a) providing the tool holder with a dampening drive member which extends about the shank portion of the tool holder, the dampening drive member having at least one cam portion formed on an upper surface thereof;

(b) inserting the shank portion of the tool holder into the spindle such that the cam portion of the dampening drive member is recessed into the cam recess of the spindle; and (c) securing the tool holder within the spindle such that the dampening drive member is compressed between the flange portion and the spindle.

20. The method of claim 19 further comprising the step of:

(d) securing a compression ring about the spindle for assisting in maintaining the shank portion of the tool holder firmly seated therewithin.

21. The method of claim 19 further comprising the step of:

(d) securing a shank portion of a cutting tool within the cutting tool mounting portion of the tool holder.

22. The method of claim 21 wherein step (d) comprises heat shrinking the shank portion of the cutting tool within the cutting tool mounting portion of the tool holder.

* * * * *